Figure 1:
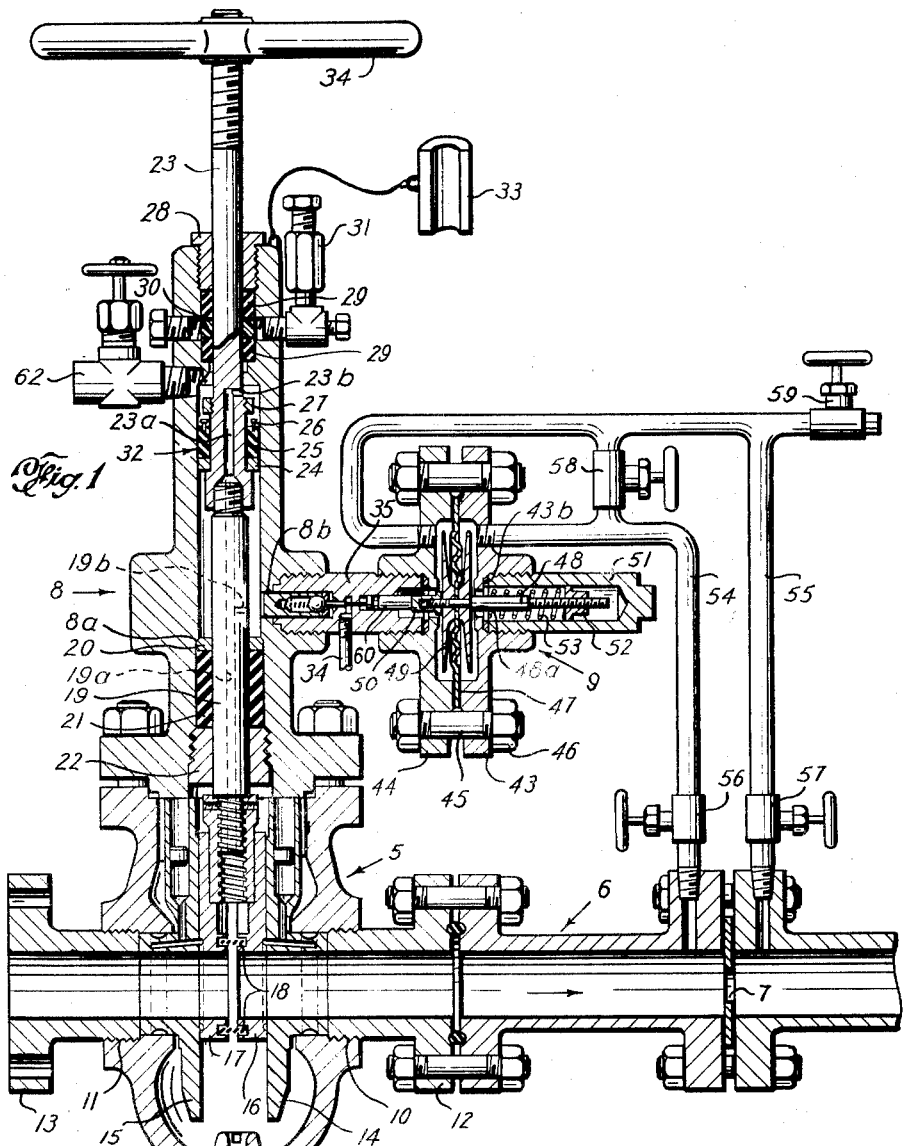

Sept. 4, 1951

H. C. OTIS 2,566,775

SAFETY CONTROL DEVICE

Filed Dec. 17, 1948

Herbert C. Otis
INVENTOR

BY Browning & Simms

ATTORNEYS

Patented Sept. 4, 1951

2,566,775

UNITED STATES PATENT OFFICE 2,566,775

SAFETY CONTROL DEVICE

Herbert C. Otis, Dallas, Tex.

Application December 17, 1948, Serial No. 65,902

8 Claims. (Cl. 137—153)

This invention relates to improvements in safety devices and refers more particularly to pressure actuated valves for closing or shutting off flow of fluid through a conduit when predetermined flow conditions exist in the conduit and to a novel relief valve and actuating mechanism therefor.

In many operations involving the transportation of fluids under high pressures through pipelines or conduits, it is desirable to provide safety control devices which will automatically close upon existence of predetermined flow conditions within the conduit. It is desirable that these safety devices, at least in some instances, as for example in light hydrocarbon gas systems such as propane or butane systems, be installed as near the source of fluid being transported as is feasible. Also, it is desirable to provide a device that will be extremely sensitive so as to operate when the pressure differential across a flow restrictor in the conduit controlled or other controlled fluid is within say one or two ounces per square inch of a predetermined differential even though this predetermined differential may be many pounds per square inch.

An object of this invention is to provide an improved surface safety control device which will positively close substantially upon the occurrence of predetermined flow conditions within the conduit controlled by the device.

Another object is to provide a device of the character described that may be installed in a flow conduit directly adjacent the source of material being transported.

Still another object is to provide an improved and very sensitive relief valve which may be used to control the actuation of safety devices of the character described herein.

Yet another object is to provide an improved pressure actuated mechanism for safety devices of the character described herein.

Other and further objects of this invention will appear from the description.

Figure 2:
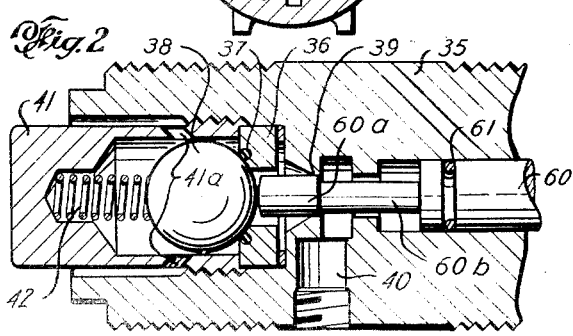

In the accompanying drawings which form a part of the instant specification and are to be read in conjunction therewith, and wherein like reference numerals are employed to designate like parts in the various views:

Fig. 1 is a vertical cross-sectional view through a conduit and a safety surface control valve constituting an embodiment of this invention, and Fig. 2 is a view, upon an enlarged scale, illustrating in detail the valve portion of the relief valve shown in Fig. 1.

Referring to the drawings, the surface safety control device of this invention may be considered generally as comprising a main valve with a valve body 5 disposed, in a conduit 6 with a flow restrictor 7 therein, and a pressure actuating mechanism for the main valve including a bonnet 8 mounted on the valve body and a pressure relief valve 9. The pressure relief 9 has suitable pressure fittings with conduit 6 on both sides of restrictor 7 whereby the valve operates in response to the pressure drop across the flow restrictor. The actuating mechanism also includes a pressure responsive member 32 within a chamber provided by bonnet 8, which is pressurized on both sides of the pressure responsive member by an equal pressure. The relief valve 9 is connected to the bonnet so as to relieve the pressure on one side of the pressure responsive member to actuate the pressure responsive member and close the valve when a predetermined flow condition occurs in conduit 6.

Referring to the details of the structure shown in the drawings, the valve body 5 has openings 10 and 11 for receiving fittings to secure the valve body in the conduit 6. These fittings may be flanged members as shown at 12 and 13 respectively. Interiorly of the body 5 are two seat members 14 and 15 having annular portions fitting within the openings 10 and 11 respectively. These seat members may be of the lubricated type as shown in the drawings or any other suitable seating arrangement may be employed. The main valve member may be of the gate type and in the embodiment shown in the drawings, the gate is made up of two sections or members 16 and 17 urged apart and against the corresponding seat members 14 and 15 by resilient elements 18.

The gate members 16 and 17 are secured to the lower end of an actuating rod or stem 19 which extends upwardly into the interior of bonnet 8 through a stuffing box made up of a backer ring 20, packing 21, and gland nut 22. The backer ring 20 abuts an inturned shoulder 8a formed internally of the bonnet 8 and the gland ring 22 is threaded interiorly to the bonnet and may be tightened therein to compress the packing. The stuffing box provides a seal between the bonnet and steam 19 but permits movement of the stem axially.

At its upper end stem 19 is connected to an extension 23. A pressure responsive member 32 is mounted on this stem and extension and may be in the form of a backer plate 24, resting against an external shoulder adjacent the lower end of extension 23, and a lip type seal element of annular configuration encircling extension 23 and its lower end abuts the backer ring 24. The lip surfaces of the ring 25 are upturned and held separated by an annular member 26. A nut 27 threaded to the extension 23 limits movement of the seal element 25 and separator 26 axially on the extension.

In order to provide a pressure chamber for the pressure responsive member, a suitable seal should be provided about the stem extension 23 at the free end of the bonnet. This may be in the form of a stuffing arrangement including gland nut 28 threaded to the bonnet and resilient seal elements 29, held spaced apart by a suitable lubricant or plastic packing 30. The lubricant may be introduced thereto by a conventional charging mechanism as shown schematically at 31.

With the seal arrangements at both ends of bonnet 8, a sealed pressure chamber is provided interiorly of the bonnet and houses the pressure responsive member 32. This pressure responsive member divides the interior of the pressure chamber into two compartments of variable capacities dependent upon the position of the pressure responsive member within the chamber.

Means are provided for pressurizing each of these compartments with an equal pressure and this may be accomplished by including in the stem and stem extension passages 19a and 23a. These axial passages communicate with each other and with the interior of the valve body 5. They also communicate with the interior of the pressure chamber on both sides of the pressure responsive member through radial passages 19b and 23b. The radial passage 19b may be arranged just above backer ring 20 so that communication between the lower compartment and the interior of the valve body is shut off when the pressure responsive member is moved downwardly to close the main valve sufficiently to move passage 19b into the lower stuffing box.

It will be understood that the pressure responsive member is operably linked with the valve member so that movement of the pressure responsive member is reflected by corresponding movement of the valve member to open or close the main valve. The valve may be manually opened by placing the spacer 33 upon the top of gland nut 28 and then manipulating the hand wheel 34 which is threaded to the upper end of stem extension 23. When opened, the hand wheel should be raised to its upper position as shown in the drawings and spacer 33 removed from the operative position to insure proper closing of the valve. Manual valve 62 may be opened to vent the upper pressure compartment to facilitate the opening operation.

In order to actuate the valve in response to flow conditions existing in conduit 6, provision is made for means to relieve the pressure from the compartment on the under side of pressure responsive member 32 when the flow conditions are such as to provide a predetermined pressure drop across restrictor 7. This pressure relief means includes the pressure relief valve shown generally at 9 for controlling a lateral port 8b in the bonnet. This port communicates between the pressure chamber on the lower side of pressure responsive member 32 and a vent connection 34 which may discharge into the atmosphere or into a suitable receptacle, pipeline, flare or the like. If the vent discharges into such a container, the pressure therein must be much less than the pressure downstream of the flow restrictor 7 under conditions that will effect a closing of the main valve.

The pressure relief valve 9 may be considered as composed of a valve part for controlling the port 8b and a pressure sensitive actuating mechanism therefor. The first part is detailed in Fig. 2.

Referring to Fig. 2, a body, housing, or fitting 35 is shown which is adapted to be threaded into a large diameter portion of port 8b. This fitting 35 has an axial opening therethrough having varying diameter portions. Residing within this opening is a valve seat which may be made up of a seat ring 36 having a resilient seal element 37 against which a valve member 38 is urged by the pressure differential between the pressure chamber and the vent. Downstream of the seat 26 is a constriction 39 in the opening. Adjacent the constriction 39 and communicating with the axial opening but downstream of the constriction is the lateral opening 40 in which the vent 34 is connected. The seat 36 is held in position within the fitting by a valve cage member 41 threaded in an enlarged portion of the bore or opening through fitting 35. The cage 41 has a recess in which the valve element which may be a ball valve 38 resides. A coil spring 42 is provided for urging the ball valve against seat 36 and 37 and the cage has lateral openings 41a to complete the passage between the central passage through the seat ring and the port 8b.

The mechanism for actuating the valve member 38 includes a pressure chamber which houses a pressure responsive member dividing the chamber into two parts. This chamber preferably is in the form of a two-part diaphragm housing 43 and 44 suitably joined together, as by studs 45 and nuts 46, with the diaphragm 47 lodged therebetween to provide a seal. The diaphragm preferably is of a rigid flexible metallic material such as steel which will stand up under high pressure differentials. A stem 48 is carried by the diaphragm extending through a central aperture therein. To accomplish this, two clamp members 49 are sealingly clamped over the inner edge of the diaphragm adjacent the central aperture therein and held in clamping position by shoulder 48a provided on the stem and nut 50 threaded to the end of the stem on the other side of the clamping members.

The housing for the pressure chamber also includes a dome member 51 threaded in the central boss of part 43 and sealed thereto. Within the dome member resides one end of rod or stem 48 to which is threaded a stop nut 52 which may be adjusted axially on rod 48. About the rod 48 and between the nut 52 and a shoulder 43b carried by part 43 there is lodged in compression a resilient element 53. This resilient element is preferably a coil spring and urges the diaphragm and rod 48 away from the ball valve 38.

This housing, together with the pressure responsive member just above described, is threaded to the right hand end of fitting 35, a seal being provided between the fitting and the housing. The part 44 of the housing has an apertured central boss for receiving the fitting. The pressure compartments on both sides of the diaphragm may be pressurized by any suitable control pressures. In the embodiment shown this is done by providing conduits 54 and 55 communicating with conduit 6 on opposite sides of restrictor 7 and with the housing on opposite sides of the pressure responsive member by connecting line 54 with part 43 and line 55 with part 44. Suitable valves may be provided to control these lines. These valves are shown at 56, 57, 58 and 59 and are all manually operated.

It is necessary to provide a linkage between the valve adapted to seat at 38 and the pressure responsive member in order that the valve 38 may be controlled in response to the pressure differential across the pressure responsive member 47. This linkage includes a part 60 which is movable independently of the pressure responsive member. This part or portion of the linkage may be in the form of a plunger and a suitable sliding seal is provided between the plunger and the axial opening through fitting 35. An O-ring seal element 61, residing in an annular groove in the periphery of plunger 60 has been found to be satisfactory for this purpose.

The area across this seal 61 should be at least somewhat less than the area across the seal 37 of the seat. With this arrangement, the force due to the pressure differential across the plunger will be less than the force tending to seat the valve member 38 due to the pressure differential thereacross and thus there will be no likelihood of accidental displacement of the valve member 38. However, the area across the plunger should be greater than the cross-sectional area of constriction 39 so that the pressure differential urging the plunger in a valve unseating direction will create a resultant force to unseat the valve greater than the force due to the pressure differential across head 60a residing in the constriction 39 when the valve member 38 is slightly cracked off its seat 37. With this arrangement, upon slight cracking of the valve member 38 from its seat, the pressure will tend to equalize across the valve member due to the substantial filling of the constriction 39 by the head 60a of the plunger. However, as the plunger moves the valve member toward full open position, the reduced diameter portion 60b is moved into the constriction 39 to provide a relatively large annular opening for venting one compartment within bonnet 8.

The independently movable portion 60 of the rod renders the pressure actuated mechanism more sensitive and also adds to the length of the stroke of plunger 60 in order to move the valve member 38 to fully opened position. Where metallic diaphragms are employed as the pressure responsive member, only slight flexing movement can be obtained at a given pressure differential, and where resilient elements such as springs are employed to predetermine the actuation of the valve, an increasingly strong force is required to flex the resilient element further and further. In the arrangement of this invention, the pressure responisve member is utilized to trip the valve and just a slight axial movement of plunger 60 is effected by this. Upon slight cracking or tripping of the valve 38, the pressure differential thereacross is substantially equalized. Spring 42 preferably is only a very weak spring having sufficient strength only to gently urge valve 38 against the seat. Thus, with the valve member slightly cracked from the seat, the only substantial force opposing movement of rod 60 in valve opening direction is the force due to the pressure differential across the constriction acting against the area of head 60a of the plunger. As pointed out, this force is less than the force across the plunger at seal 61 because of the pressure acting against the greater area of this portion of the plunger. This force is then relied upon to move the valve member to full open position.

It is believed that the operation of the invention is apparent from the foregoing description. The valve body 5 is connected in a flow line in which is also connected a flow restrictor 7 located preferably downstream from the valve member. This downstream location is preferable because of ease of changing the restrictor either to replace a worn element or in order to adjust the operation of the device for a change in flow conditions. When this is desired, the main valve gate may be moved to closed position to close the line upstream from the location of the necessary changes. Also, with the flow restrictor located downstream from the safety control device, the device may be installed closer to a source of pressure fluid, adding to the safety of the installation.

With the pressure responsive member 32 in a raised position interiorly of bonnet 8, the gate valve member is in raised position providing a continuous passageway through the flow device. The pressure drop across flow restrictor 7 is reflected in the compartments on the opposite sides of diaphragm 47. At the same time, the compartments of the pressure chamber within bonnet 8 are pressurized with substantially equal pressures from the interior of body 5.

The main safety valve or gate will remain in an open position as long as the flow velocities through conduit 6 are such that the presusre drop across restrictor 7 does not exceed a predetermined amount. This amount is determined by the resilient element 53, but it is contemplated that in some instances the resilient element 42 may be selected to have a sufficiently strong and known tension to influence the opening of the valve. Ordinarily, however, a spring 42 will be selected that is so weak as to have negligible effect upon the opening of the valve.

When this predetermined pressure drop exists across restrictor 7, it is reflected across diaphragm 47 and will cause the diaphragm to flex, against the tension of spring 53, in a direction to move plunger 60 in valve opening direction. During flow conditions in conduit 6 within the range of normal operation the pressure differential across valve 38 and seat ring 37 is greater than the pressure differential across plunger 60 at seal 61 because this latter differential is based upon the low pressure side of restriction 7. In addition, the area across seal 61 is preferably not greater than and usually somewhat less than the area across seal 37 so that the resultant force exerted upon plunger 61 is such as to urge the plunger toward the diaphragm.

When the pressure drop across diaphragm 47 is great enough to overcome the forces resisting unseating of the ball valve 38, the valve is unseated slightly due to the flexure of the diaphragm. When this occurs, the pressure drop across the valve is substantially eliminated due to the obstruction of the constriction 39 by the head 60a of the plunger. This reduces the effective force tending to resist opening of the valve member 38 to less than the force due to the pressure drop across seal 61 because of the smaller area of the head 60a as compared with the area across seal 61. This then effects a snap action and positive opening of the valve element 38.

When the valve element 38 is moved past its seat, the pressure within the compartment of the pressure chamber of bonnet 8 below pressure responsive member 32 is quickly relieved and the resultant pressure differential across pressure responsive member 32 forces the member downwardly to close the gate members 16 and 17.

The port 19b in the actuating stem 19 is preferably very small such as for example, a diameter of 1/32 of an inch or the like. With this small diameter and the relatively large opening through restriction 39, with the part 60b of the plunger residing therein, the pressure is quickly reduced. By providing a sufficiently small diameter opening 19b, the constriction 39 may be dispensed with for even a slight cracking of valve 38 will effect the reduction of pressure within the pressure compartment below pressure responsive member 32. However, this arrangement is not preferred for it is not as positive and quick in its operation.

When it is desired to reopen the safety device, usually there will be no flow through conduit 6 downstream from the device and the pressures to which diaphragm 47 are subjected will be atmospheric. The weak spring 42 will have urged the ball valve 38 to seated position, moving plunger 60 to the position shown in Fig. 1. Valve 56 may then be closed to prevent a sudden building up of pressure on the spring side of the diaphragm which might cause accidental opening of the relief valve to close the safety surface device again. Then valve 62 is temporarily opened to relieve the pressure within the bonnet above the piston 32 during raising thereof. Member 33 is placed about stem extension 23 and resting on nut 28. Handle 34 is then rotated, the threaded connection between the handle and the extension 23 raising the stem, piston 32, and gate valve element. Valve 56 may then be opened to pressurize the compartment on the side of the diaphragm with which it communicates placing the safety device in operation.

If unusual flow conditions are to be encountered in conduit 6, which would ordinarily cause the safety surface device to close and it is not desired for the device to close, then the pressure actuated mechanism may be rendered ineffective by closing both valves 56 and 57. Also, if it is desired to close the safety surface control valve, even though the flow conditions within conduit 6 are normal, then valve 57 may be closed and valve 59, which may be a vent or which leads to some low pressure reservoir not shown in the drawings, is opened to relieve the pressure on the low pressure side of the diaphragm 47. This will provide the necessary pressure drop across the diaphragm to close the main valve.

From the foregoing, it will be seen that this invention is one well adapted to attain all of the ends and objects hereinabove set forth, together with other advantages which are obvious and which are inherent to the structure.

It will be understood that certain features and sub-combinations are of utility and may be employed without reference to other features and sub-combinations. This is contemplated by and is within the scope of the claims.

As many possible embodiments may be made of the invention without departing from the scope thereof, it is to be understood that all matter herein set forth or shown in the accompanying drawings, is to be interpreted as illustrative and not in a limiting sense.

Having described my invention, I claim:

1. A safety device comprising in combination a valve with a valve element controlling flow therethrough, a fitting with flow restrictor means therein and a pressure responsive mechanism adapted to close the valve including a pressure chamber with a pressure responsive member therein, an operable connection between the pressure responsive member and the valve element whereby movement of the member provides for a corresponding movement of the element, means for pressurizing the pressure chamber substantially equally on both sides of the pressure responsive member, and means for relieving the pressure on the side of the pressure responsive member which will move it in a direction to close the valve when the flow through the conduit exceeds a predetermined rate, said means responsive to the pressure drop across the flow restrictor and means closing the portion of the first mentioned means which pressurizes the pressure responsive means on the side to be relieved by the second mentioned means when the valve element is in closed position.

2. In a motor operated relief valve having a body with a port therein controlled by a valve element and communicating with a vent, a motor therein including a pressure responsive member, fittings for supplying pressure thereto to subject the pressure responsive member to a control pressure differential, the improvement which resides in the combination therewith of an operating linkage between the valve element and the pressure responsive member for opening the valve upon movement of the pressure responsive member in one direction by a pressure differential thereacross, resilient means resisting movement of the pressure responsive member in said one direction, said linkage including a part movable both in response to movement of the pressure responsive member in said one direction and independently of the pressure responsive member, said part exposed to the pressure differential between the vent and the pressure on one side of the pressure responsive member and urged thereby in a direction to unseat the valve element, the mounting of the valve element being such that the pressure controlled thereby urges the seated element against the seat with a greater force than the unseating force due to the pressure differential across the independently movable part but is substantially nullified upon cracking of the valve from its seat.

3. In a motor operated relief valve having a body with a port therein controlled by a valve element and communicating with a vent, a diaphragm motor therein with fittings for supplying pressure thereto to subject the diaphragm to a control pressure differential, the improvement which resides in the combination therewith of an operating linkage between the valve element and diaphragm for opening the valve upon flexure of the diaphragm in one direction by a pressure differential thereacross, said linkage including a part movable both in response to flexure of the diaphragm and independently of the diaphragm, said part exposed to the pressure differential between the vent and the pressure on one side of the diaphragm and urged thereby in a direction to unseat the valve element, the mounting of the valve element being such that the pressure controlled thereby urges the seated element against the seat with a greater force than the unseating force due to the pressure differential across the independently movable part but is substantially nullified upon cracking of the valve from its seat.

4. In a motor operated valve having a housing with an opening therein, a vent port communicating with an intermediate portion of the opening, a valve seat at one end of the opening and a pressure chamber adjacent and communicating with the other end of the opening, a valve member mounted to be urged against the valve seat by the pressure to be controlled and a pressure responsive member within the pressure chamber, of great area as compared with the area of the seat, dividing the pressure chamber into two compartments, a resilient element urging the pressure responsive member in a direction away from the valve member, and fittings for pressurizing each compartment of the pressure chamber, the improvement which resides in the combination therewith of a constriction in the opening downstream from the seat, a linkage between the pressure responsive member and the valve residing within the opening, said linkage having a part substantially blocking the constriction in the opening with the valve member in seated position with a smaller portion adapted to be moved into the constriction as the valve member closely approaches fully opened position, said linkage having a portion shiftable axially in the passage sufficiently to fully unseat the valve member and to move independently of the pressure responsive member, said portion having an area exposed to the pressure differential across the vent opening and the pressure compartment on the side of the pressure responsive member closest to the valve seat greater than the cross-sectional area of the part of the link that substantially blocks the constriction in the axial opening, whereby upon occurrence of a predetermined pressure differential across the pressure responsive member the pressure responsive member will move sufficiently to crack the valve member on its seat whereupon the pressure across the valve member will substantially equalize and the pressure differential across the large portion of the independently movable part will move the valve member to full opened position.

5. The sub-combination of claim 4 wherein the pressure responsive member in the pressure chamber is a metallic diaphragm.

6. The sub-combination of claim 4 wherein the independently movable portion of the linkage for operating the valve member has sealing material interposed between it and the wall of the axial opening through the housing.

7. The sub-combination of claim 4 wherein the pressure responsive member in the pressure chamber is a metallic diaphragm and the fittings for pressurizing the chamber are connected to a common flow conduit upon opposite sides of a flow restrictor imposed in the conduit.

8. A safety device comprising in combination a flow conduit, a valve disposed therein with a valve element controlling the conduit, a flow restrictor in the conduit and a pressure actuated mechanism adapted to close the valve including a pressure responsive member having a drive connection with the valve element, means subjecting the pressure responsive member on both its sides to the pressure upstream of the restrictor, means for relieving the pressure on the side of the pressure responsive member which will move it in a direction to close the valve when the flow through the conduit exceeds a predetermined rate, said means including a snap action pressure relief valve having connections with the conduit on both sides of the flow restrictor and responsive to the differential thereacross and means closing the portion of the first mentioned means which supplies pressure to the side of the pressure responsive member which may be relieved by the second mentioned means when the valve element is seated.

HERBERT C. OTIS.

REFERENCES CITED

The following references are of record in the file of this patent:

UNITED STATES PATENTS

| Number | Name | Date |
|---|---|---|
| 901,202 | Anderson | Oct. 13, 1908 |
| 1,167,287 | Ford | Jan. 4, 1916 |
| 1,904,475 | Kissing | Apr. 18, 1933 |
| 1,958,262 | Boland | May 8, 1934 |
| 2,230,914 | Sherman | Feb. 4, 1941 |
| 2,291,731 | Lake | Aug. 4, 1942 |

FOREIGN PATENTS

| Number | Country | Date |
|---|---|---|
| 132,119 | Switzerland | June 1, 1929 |